US012450269B2

(12) United States Patent
Johnston

(10) Patent No.: US 12,450,269 B2
(45) Date of Patent: Oct. 21, 2025

(54) SYSTEM AND METHOD FOR DEVELOPING A COMMON INQUIRY RESPONSE

(71) Applicant: Verint Americas Inc., Alpharetta, GA (US)

(72) Inventor: Michael Johnston, Alpharetta, GA (US)

(73) Assignee: Verint Americas Inc., Alpharetta, GA (US)

( * ) Notice: Subject to any disclaimer, the term of this patent is extended or adjusted under 35 U.S.C. 154(b) by 1044 days.

(21) Appl. No.: 17/500,268

(22) Filed: Oct. 13, 2021

(65) Prior Publication Data

US 2022/0114200 A1    Apr. 14, 2022

Related U.S. Application Data

(60) Provisional application No. 63/091,058, filed on Oct. 13, 2020.

(51) Int. Cl.
*G06F 16/3329* (2025.01)
*G06F 16/332* (2019.01)
(Continued)

(52) U.S. Cl.
CPC ...... *G06F 16/3329* (2019.01); *G06F 16/3326* (2019.01); *G06F 16/338* (2019.01);
(Continued)

(58) Field of Classification Search
CPC ............. G06F 16/3329; G06F 16/3326; G06F 16/332; G06F 16/338; G06F 16/334;
(Continued)

(56) References Cited

U.S. PATENT DOCUMENTS 5,812,998 A * 9/1998 Tsutsumi ............ G06F 16/2282
6,295,529 B1 * 9/2001 Corston-Oliver ..... G06F 40/194
707/738

(Continued)

FOREIGN PATENT DOCUMENTS

EP      3680802        7/2020
WO      2014145149 A1  9/2014
WO      2017175363     10/2017

OTHER PUBLICATIONS

Emerj.com, "Artificial Intelligence for Customer Service—Current and Future Applications", available at: https://emerj.com/ai-sector-overviews/artificial intelligence-customerservice-current-future-applications/ (retrieved Jan. 17, 2022).

(Continued)

*Primary Examiner* — Huyen X Vo
(74) *Attorney, Agent, or Firm* — Dinsmore & Shohl LLP

(57) ABSTRACT

The present application includes a method and system for developing a common inquiry response. The system receives at least one customer contact formed by an inquiry and its response, analyzes the customer contact to determine the content of the inquiry and the response, and stores the inquiry and the response in a corresponding inquiry-response sub-database in an inquiry-response database. After analyzing at least one of the sub-databases, the system assigns a common inquiry-response (CIR) knowledge document to that inquiry-response sub-database for future use involving similar inquiries and responses. This allows a user to respond more quickly to inquiries with a reduced risk of incorrect or inconsistent information in the response.

20 Claims, 6 Drawing Sheets

Figure 1:
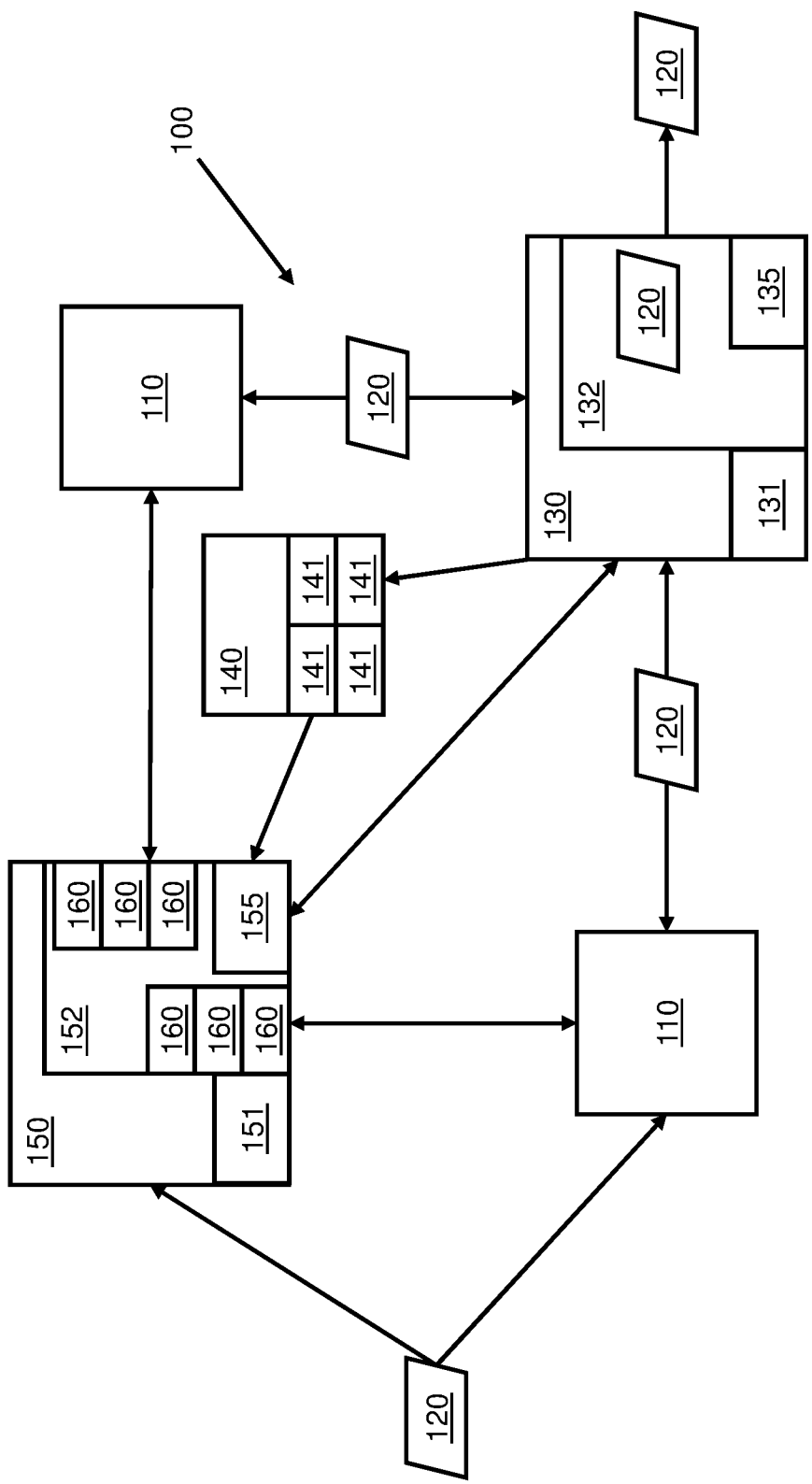

(51) Int. Cl.
  *G06F 16/338* (2019.01)
  *G06N 5/022* (2023.01)
  *G06Q 10/0639* (2023.01)
  *G06Q 30/016* (2023.01)
(52) U.S. Cl.
  CPC ......... *G06N 5/022* (2013.01); *G06Q 10/0639* (2013.01); *G06Q 30/016* (2013.01)
(58) Field of Classification Search
  CPC .. G06N 5/022; G06Q 10/0639; G06Q 30/016; H04M 3/5141; H04M 3/51; H04M 3/5158; H04M 1/26; H04M 3/527; H04L 51/56
  See application file for complete search history.

(56) References Cited

U.S. PATENT DOCUMENTS

| | | | | |
|---|---|---|---|---|
| 6,745,178 | B1 * | 6/2004 | Emens | G06F 16/9536 |
| | | | | 707/E17.108 |
| 6,751,600 | B1 * | 6/2004 | Wolin | G06F 16/353 |
| | | | | 707/E17.09 |
| 6,807,544 | B1 * | 10/2004 | Morimoto | G06F 16/38 |
| | | | | 707/999.005 |
| 6,807,607 | B1 * | 10/2004 | Lamparter | G06F 12/121 |
| | | | | 711/E12.07 |
| 6,810,404 | B1 * | 10/2004 | Ferguson | G06F 16/93 |
| | | | | 707/999.005 |
| 10,250,541 | B2 | 4/2019 | Beach et al. | |
| 2008/0195378 | A1 | 8/2008 | Nakazawa et al. | |
| 2020/0035244 | A1 | 1/2020 | Kim | |
| 2020/0287850 | A1 | 9/2020 | Ferrari et al. | |

OTHER PUBLICATIONS

International Search Report and Written Opinion of PCT/US2021/054716 Dated Jan. 24, 2022.

International Preliminary Report on Patentability issued from the International Bureau of WIPO on Apr. 27, 2023, in connection with corresponding application PCT/US2021/054716.

* cited by examiner

SYSTEM AND METHOD FOR DEVELOPING A COMMON INQUIRY RESPONSE

CROSS-REFERENCE TO RELATED APPLICATIONS

The present application claims priority of U.S. Provisional Application No. 63/091,058, filed Oct. 13, 2020, the content of which is incorporated herein by reference in its entirety.

BACKGROUND

The present disclosure is directed to a method for computer analysis, specifically a method for analyzing and developing responses to common customer inquiries.

In a modern high-volume customer engagement center (CEC), much of the work performed by customer service representatives (CSRs) is repetitive in nature. The most common customer requests for information may have simple answers, but due to either the volume of contacts or the procedures required for each contact, they take up a large percentage of a CSR's time. During times with a large volume of contact, customers with simple questions may need to wait for extended periods to receive relatively simple answers. In turn, customers with complicated issues must wait for a CSR to finish with the large volume of simple questions, leading to frustration on the customers' part. In the event of an emergency, a significant influx of calls, emails, text messages, website visits, and chats may all be requesting statuses related to a single sudden event, which may occur during a period of limited staffing.

Questions from different modes of contact such as, but not limited to, email and telephone, may not have standardized responses, leading to confusion if one answer is given over the phone and another in an email. While some systems offer the option to read or listen to responses to frequently asked questions (FAQs), the FAQs are determined retroactively. Formulation of such FAQs also relies on the CSR correctly recalling the numbers and types of questions asked, and takes time that may be spent more productively. Further, accessing the FAQs requires the CSR to manually and subjectively search for the common response to the inquiry (which may or may not exist in the FAQ). Additionally, changes in the most frequent inquiries due to, for example, a change in a financial institution's standard procedures, may be slow to update in the FAQs, leading to more confusion.

There is an unmet need in the art for a system and method capable of automatically developing a common inquiry response from a group of inquiries and responses, and then automatically applying the response to outgoing communications.

SUMMARY

An exemplary embodiment of the present application is a method for developing a common inquiry response using a dynamic analysis (DA) system in a customer engagement center (CEC) system. The method includes providing the DA system in the CEC system, wherein the DA system includes at least one DA desktop, at least one speech/text analytics service (STAS) unit, an inquiry-response database, and a dynamic analysis engine (DAE). The DAE is operatively connected to the at least one DA desktop, the at least one STAS unit, and the inquiry-response database. The method receives at least one customer contact into the at least one DA desktop, the customer contact comprising an inquiry and a response to the inquiry. The method then analyzes the customer contact in the at least one STAS unit according to at least one contact analytics rule to determine the content of the inquiry and the response. Next, the method analyzes the content of the inquiry and the response with the DAE to calculate a similarity score from the inquiry and the response. The method then stores the inquiry and the response in a corresponding inquiry-response sub-database in the inquiry-response database based upon the similarity score. Next, the method analyzes at least one of the inquiry-response sub-databases in the DAE according to at least one inquiry analytics rule to determine the common response for that inquiry-response sub-database. The method then assigns at least one common inquiry-response (CIR) knowledge document to the analyzed inquiry-response sub-database.

Another exemplary embodiment of the present application is a CEC system for developing a common inquiry response. The CEC system includes a DA system. This DA system includes a DA processor and a non-transitory computer readable medium programmed with computer readable code that upon execution by the DA processor causes the DA processor to execute the above-mentioned method for developing a common inquiry response.

Another exemplary embodiment of the present application is a non-transitory computer readable medium programmed with computer readable code that upon execution by a DA processor causes the DA processor to execute the above-mentioned method for developing a common inquiry response on a CEC system.

The objects and advantages will appear more fully from the following detailed description made in conjunction with the accompanying drawings.

BRIEF DESCRIPTION OF THE DRAWING(S)

FIG. 1 depicts an exemplary embodiment of a dynamic analysis system for developing a common inquiry response.

FIGS. 2a, 2b, 2c, and 2d depict a flowchart of an exemplary embodiment of a method for developing a common inquiry response and utilizing such a response in real time.

Figure 3:
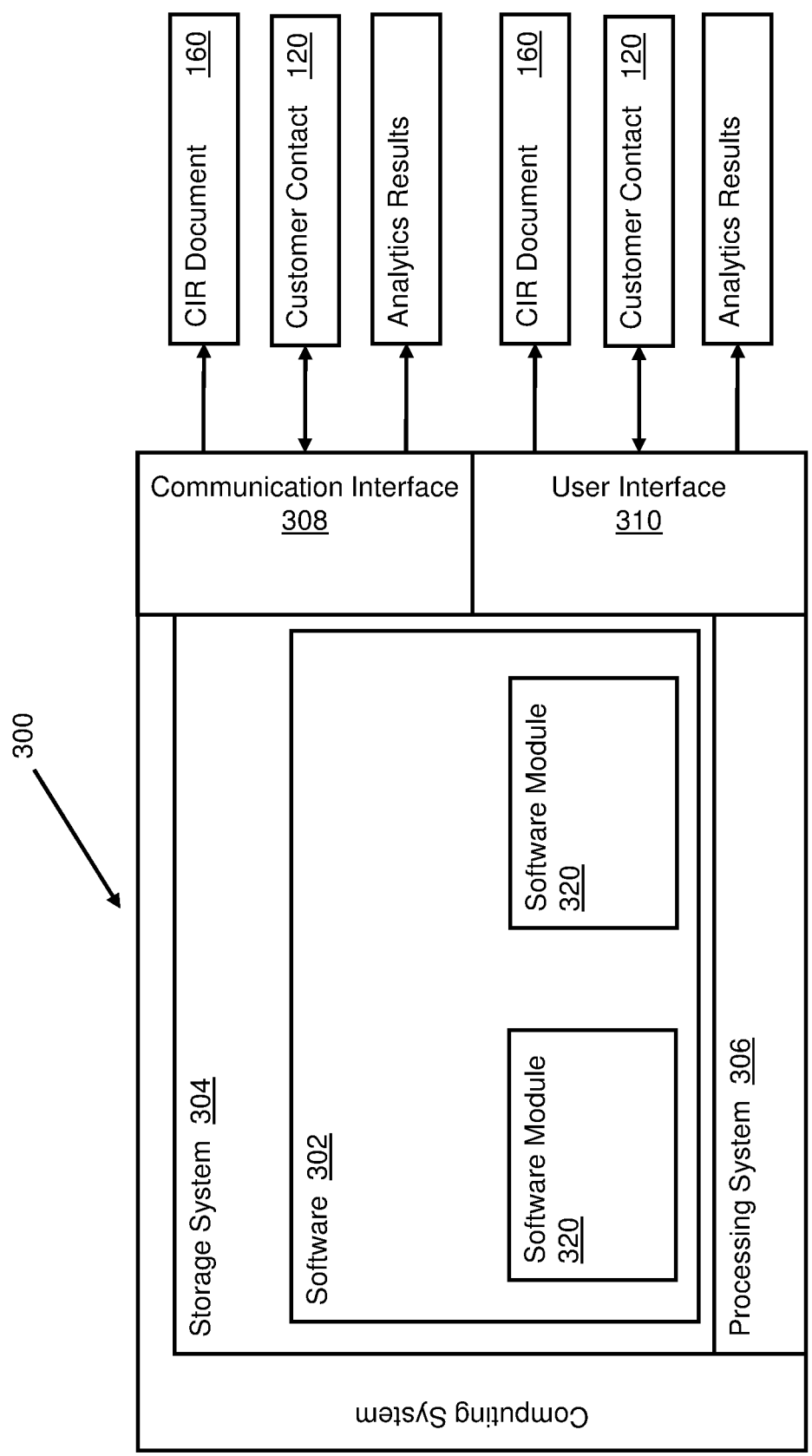

FIG. 3 depicts an exemplary embodiment of a computer system for developing a common inquiry response.

DETAILED DESCRIPTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Dynamic analysis (DA) systems allow ongoing analysis of contacts with customers on CEC systems. By analyzing inquiries going through the CEC system in real and/or delayed time using a linked DA system, the DA system can allow an organization to achieve several key benefits. First, the DA system can be integrated with existing CEC systems, allowing CSRs to continue using current, familiar CEC systems. Second, the DA system will automatically update the preexisting knowledge base to account for changing inquiries, thereby ensuring consistent, constantly updated CSR scripts and templates, and reduced backlogs and customer dissatisfaction. Third, the system can prompt the CSR to use a template that they may not have previously known about. Fourth, the DA system can detect and develop responses for low-volume inquiries that are nonetheless highly amenable to template responses. Fifth, in the event that a CSR goes off-script from the standard response, the system can stop the non-compliant response from being delivered and/or alert human resources (HR) or supervisory staff that the CSR is potentially providing incorrect communications to a customer.

FIG. 1 depicts an exemplary embodiment of a DA system 100 for developing a common inquiry response for use in a CEC system (not shown). The DA system 100 includes at least one DA desktop 110 used by a CSR for incoming and outgoing customer contacts 120, which commonly take the form of paired inquiries from customers and responses from CSRs. In the exemplary embodiment, at least one additional DA desktop 110 may be used by HR or supervisory staff to review customer contacts 120. By way of non-limiting example, customer contacts 120 may include a telephone inquiry and/or conversation between the CSR and a customer, a written inquiry and/or communication between the CSR and a customer, a website update or other alteration, a scheduled or spontaneous post on a social networking or content-sharing service, a post on a review site, a press release, or any other one-way or two-way customer contact 120.

The DA system 100 includes a set of contact analytics rules 135 and a set of inquiry analytics rules 155 used to analyze all information received by the DA system 100, including customer contacts 120. The contact analytics rules 135 may include analysis standards for verbal and/or textual communications, such as, but not limited to, keyword identification, sentence stemming, word and punctuation standardization, metadata extraction, and intent. The inquiry analytics rules 155 may include comparison standards for verbal and/or textual communications, such as, but not limited to, keyword identification, sentence stemming, and intent. The inquiry analytics rules 155 may also include standards for analyzing common inquiry topics, trends in inquiry topics, and CSR use of common inquiry-response (CIR) knowledge document.

The contact and inquiry analytics rules 135 and 155 may include exceptions and the conditions for exceptions. The contact and inquiry analytics rules 135 and 155 may be user-generated or pre-generated, and may be updated by users or automatically updated by DA system 100 itself. The contact and inquiry analytics rules 135 and 155 may be a software program or programs, or a separate file or files executed by a software program.

The DA system 100 includes at least one speech/text analytics service (STAS) unit 130 having a STAS software module 131 and an optional STAS storage 132. In the embodiment shown, STAS storage 132 stores contact analytics rules 135. The STAS unit 130 may be a processor or a combination of a processing system and a storage system. The STAS unit 130 intercepts customer contacts 120 running through CEC desktop(s) 110 and analyzes and/or standardizes customer contacts 120. The STAS unit 130 uses STAS software module 131 and contact analytics rules 135 to determine any keywords and/or intent from both the inquiry and the response, as well as extract metadata related to the associated customer contacts 120. The STAS unit 130 may also possess speech-to-text capabilities to convert verbal communications to a text record. The STAS unit 130 may also possess standardization capabilities to convert all contacts to a standardized format. Optionally, STAS unit 130 may also permanently or temporarily save a copy of the customer contact 120 to internal or external STAS storage 132.

The DA system 100 also includes an inquiry-response database 140 containing multiple inquiry-response sub-databases 141. Each set of related inquiries and their corresponding responses extracted by STAS unit 130 has a separate inquiry-response sub-database 141. Inquiry-response pairs may be grouped within sub-databases 141 based on intent and/or keywords according to contact analytics rules 135.

Each sub-database 141 may also include the metadata and/or tallies of the number of times the inquiry-response pair occurs over a given period of time or number of customer contacts 120. Metadata may include information such as, but not limited to, sending or receiving email or IP address, a username for chat session, a telephone number, or captured voice data. Captured voice data may include information such as, but not limited to, identifying data, account number, date of birth, or password. Metadata may be used to match specific contacts 120 with a customer or account, match specific contacts 120 within a particular conversation to add a specific identifier to a subject line, or match a contact 120 to an open complaint or case.

The DA system 100 also includes a dynamic analysis engine (DAE) 150 having a DAE software module 151 and an optional DAE storage 152. In the embodiment shown, DAE storage 152 stores inquiry analytics rules 155. The DAE 150 may be a processor or a combination of a processing system and a storage system. The DAE 150 can dynamically update inquiry analytics rules 155 or receive updates to inquiry analytics rules 155 from DA desktop 110. The DAE 150 receives the paired inquiries and their responses from at least one inquiry sub-database 141 and analyzes them using DAE software module 151 and inquiry analytics rules 155 to provide the common response for that particular sub-database 141. Such a capability may also be used to determine if a CSR has accurately relayed compliance phrases to a customer in a response.

For each inquiry and response, the DAE 150 may utilize a pattern matching or recommender algorithm to find similar inquiries and responses. In one embodiment, the algorithm is a context-aware collaborative filtering algorithm. The DAE 150 may assign a similarity score to the instant inquiry or response based on how closely it matches existing inquiries or responses. Inquiries and responses with similarity scores above a high threshold may be used as a CIR knowledge document 160 or the basis for templates. Inquiries and responses with similarity scores below a low threshold may directed to a CSR or other user for special examination.

In practice, once the common response is determined, DAE 150 may generate or select the CIR knowledge document 160 for a new inquiry based on the similarity score. The CIR knowledge document 160 may take the form of verbal and/or textual scripts and/or templates, training materials, informational articles, and/or any combination thereof, and may be displayed on DA desktops 110. Once generated, each CIR knowledge document 160 may be updated after a set period, when DAE 150 indicates a significant shift in the paired inquiries and their responses, upon change to contact or inquiry analytics rules 135 or 155, or manually.

Once CIR knowledge documents 160 have been generated, DA system 100 can intercept customer contacts 120 and analyze them in real time with STAS unit 130. The STAS unit 130 may use STAS software module 131 and contact analytics rules 135 to determine any keywords and/or intent from both the inquiry and the response. The results may then be communicated to DAE 150 for analysis to determine any applicable CIR knowledge document(s) 160. The DAE 150 can then automatically transmit at least one appropriate CIR knowledge document 160 for display on DA desktop 110.

As discussed above, the DA system 100 may also intercept and analyze outgoing customer contacts 120 to determine if they use CIR knowledge document 160 correctly. Responses analyzed by the DAE 150 with resultant similarity scores below a low threshold indicate an incorrectly used CIR knowledge document 160. Outgoing customer contacts 120 that do not use CIR knowledge document 160 correctly may be blocked, copied and flagged for future review, or rerouted to the DA desktop 110 of HR or supervisory staff for review.

By way of non-limiting example, if an incoming inquiry has a similarity score with an inquiry in the inquiry sub-database 141 above the high threshold, the common response for the inquiry sub-database 141 will be provided to the CSR. By way of further non-limiting example, if an outgoing response has a similarity score with the common response in the inquiry sub-database 141 below the low threshold, the outgoing response will be routed to a supervisor for review of the CSR's work.

Outside of active customer communications, DA system 100 may provide analytics to users about common inquiry topics, trends in inquiry topics, and CSR use of CIR knowledge documents 160. Based on such analytics, DA system 100 may recommend updates to existing templates and scripts, modifications to CSR training, or retraining CSRs to accommodate shifts in topics subject to increased inquiry. The DA system 100 may provide updates to publicly available information as well, such as, but not limited to, website FAQ sections and prerecorded inquiry responses on telephone lines.

FIGS. 2a through 2d depict a flowchart of an exemplary embodiment of method 200 for developing and using a common inquiry response using the DA system 100 on or in the CEC system.

Figure 2A:
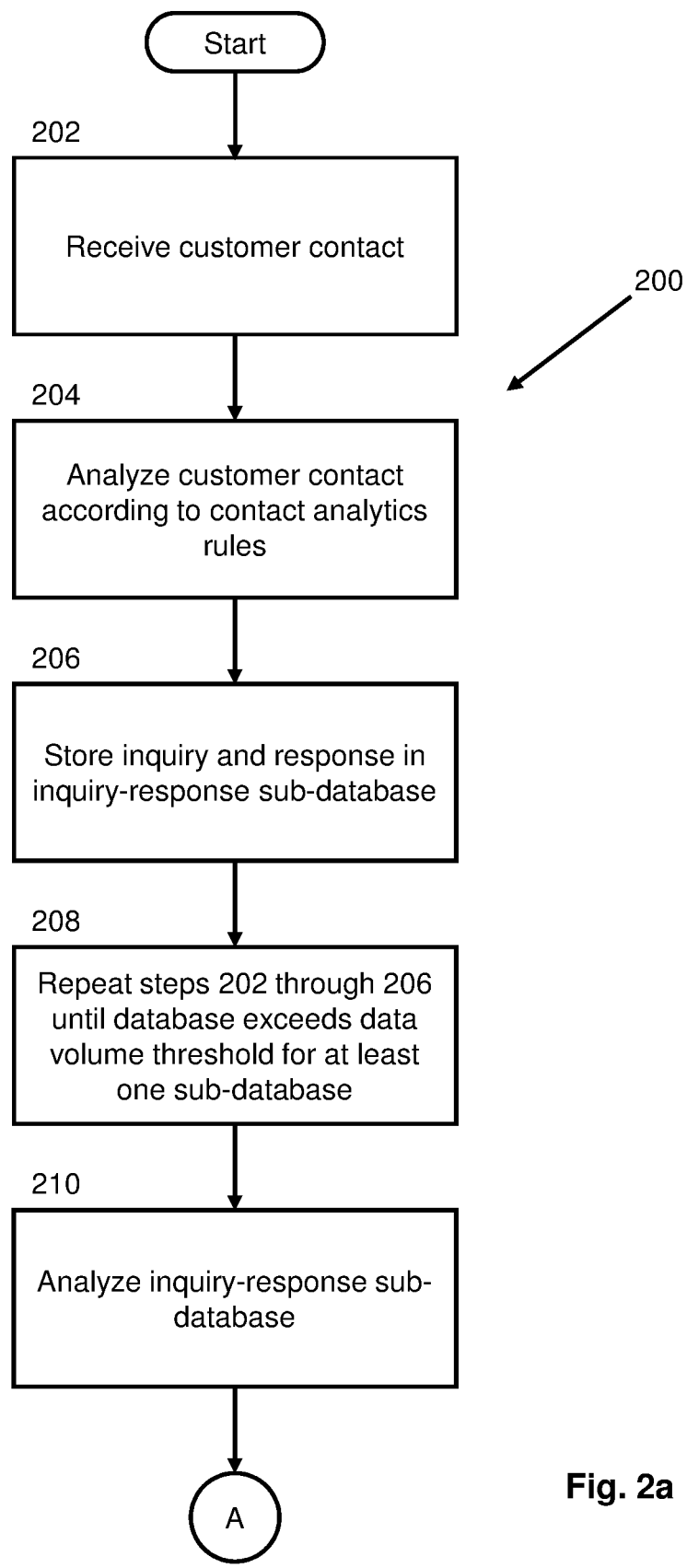

As shown in FIG. 2a, in step 202, the DA system receives at least one customer contact. The customer contact may be an email, text chat, telephone call, video call, or any other type of contact with a customer. In certain embodiments, the customer contact may be a textual transcription of a prior verbal or video customer contact. Such transcriptions may or may not include additional data related to tone and/or sentiment of the customer contact, or any additional data not included in the objective transcription, such as, but not limited to, metadata.

In step 204, the STAS unit analyzes the customer contact according to contact analytics rules to determine the content of the customer inquiry and the CSR response. This step may include speech-to-text conversion and conversion of the contact to a standardized format. Analysis of the inquiry may also be used to extract metadata.

In step 206, the DAE analyzes the customer contact and, based on the calculated similarity score, the DA system stores the inquiry and the response in the corresponding inquiry-response sub-database in the inquiry-response database. The DAE may use a pattern matching or recommender algorithm for this analysis. Optionally, DA system may also store the inquiry and the response in the STAS unit.

In step 208, the DA system repeats steps 202 through 206 until the inquiry-response database exceeds a data volume threshold for at least one inquiry-response sub-database. Step 208 ensures that the inquiry-response database has a volume of data to allow statistically meaningful analysis of at least one inquiry-response sub-database.

In step 210, the DAE analyzes at least one of the inquiry-response sub-databases to determine the common response for that particular inquiry-response sub-database. As above, the DAE may use a pattern matching or recommender algorithm to calculate a similarity score and utilize a response from an inquiry with a similarity score above a high threshold.

Figure 2B:
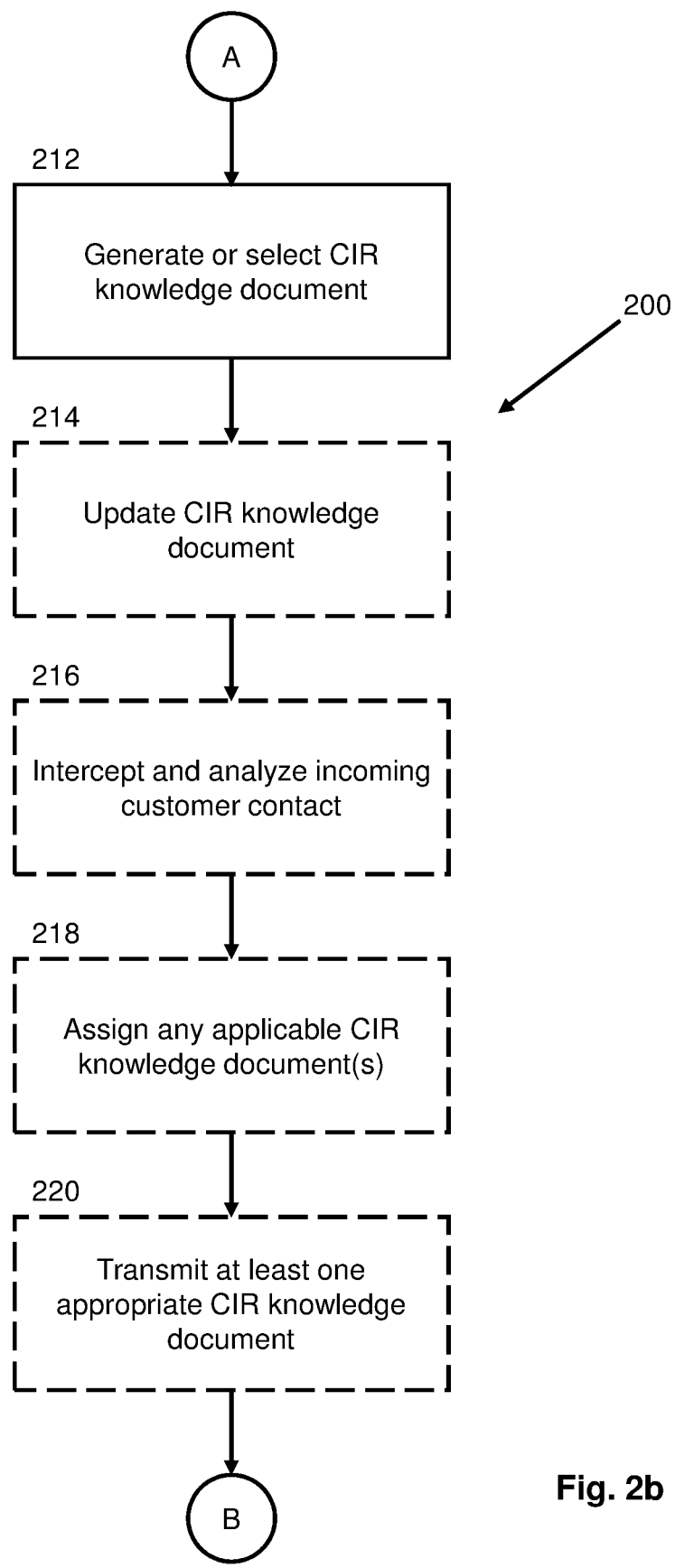

As shown in FIG. 2b, in step 212, the DAE assigns an applicable common inquiry-response (CIR) knowledge document to the analyzed inquiry-response sub-database. Assigning the CIR knowledge document may comprise generating the CIR knowledge document or storing an existing CIR knowledge document for later retrieval.

In optional step 214, the DAE reassigns and/or updates the CIR knowledge document. Reassignment may occur after a set period, when the DAE detects a significant shift in the paired inquiries and their responses beyond a preset threshold, or upon change to the contact or inquiry analytics rules, or may be made manually by a CSR or other staff. Reassignment may include updating the CIR knowledge document or storing a different CIR knowledge document. Step 214 may occur at any time after generation of the CIR knowledge document.

In optional step 216, the DA system intercepts an incoming customer contact and analyzes it in real time with the STAS unit using the contact analytics rules to determine any keywords and/or intent.

In optional step 218, the results of the analysis of step 216, the keywords and/or intent, are communicated to the DAE for analysis using the inquiry analytics rules to determine if any appropriate CIR knowledge document(s) exist in the DA system based on the similarity score between the incoming inquiry and the inquiry associated with the CIR document.

In optional step 220, the DAE automatically transmits at least one appropriate CIR knowledge document for display on the DA desktop.

Figure 2C:
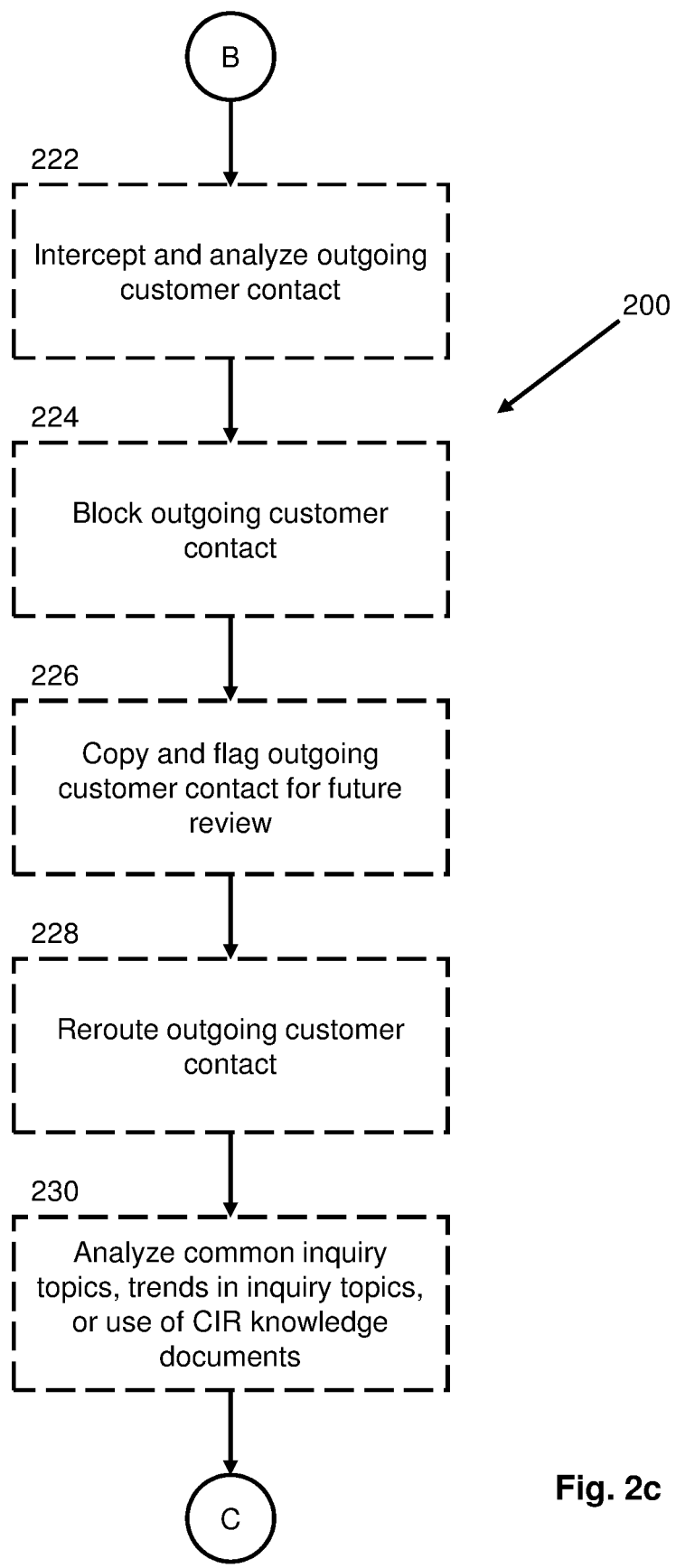

As shown in FIG. 2c, in optional step 222, the DA system intercepts an outgoing customer contact and analyzes it in real time with the DAE using the inquiry analytics rules to determine if the originating CSR or other author correctly used the CIR knowledge document.

In optional step 224, the DA system automatically blocks the outgoing customer contact based on the result of the analysis of step 222 if the similarity score is below a low threshold.

In optional step 226, the outgoing customer contact is copied and flagged for future review based on the result of the analysis of step 222 if the similarity score is below a low threshold.

In optional step 228, the outgoing customer contact is rerouted to the DA desktop of HR or supervisory staff for review based on the result of the analysis of step 222 if the similarity score is below a low threshold.

In optional step 230, the DAE analyzes at least one of common inquiry topics, trends in inquiry topics, and CSR use of CIR knowledge documents using the inquiry analytics rules.

Figure 2D:
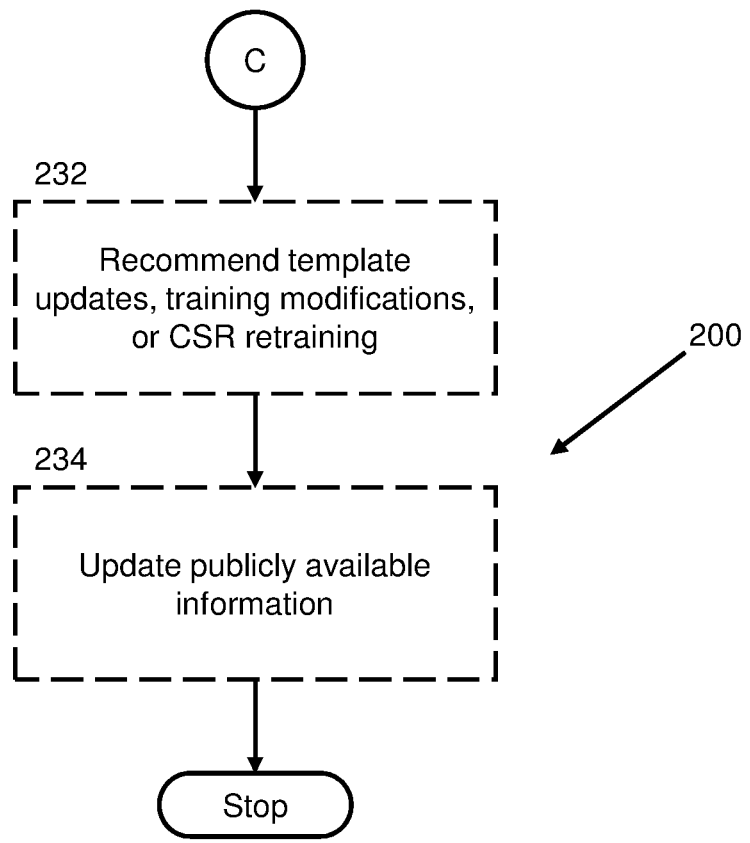

As shown in FIG. 2d, in optional step 232, the DA system recommends updates to existing templates and scripts, modifications to CSR training, or retraining CSRs based on the result of the analysis of step 230.

In optional step 234, the DA system updates publicly available information based on the result of the analysis of step 230.

FIG. 3 depicts an exemplary embodiment of a system 300 for developing a common inquiry response. The system 300 may form a part of or be operably connected to a main CEC system. System 300 is a computing system that includes a processing system 306, a storage system 304, software 302, a communication interface 308, and a user interface 310. Processing system 306 loads and executes software 302 from the storage system 304, including at least one software component 320. When executed by computing system 300, software component 320 directs the processing system 306 to operate as described herein in further detail in accordance with the method 200. Computing system 300 is a specialized system specifically designed to perform the steps and actions necessary to execute the method 200 for developing a common inquiry response and the DA system 100. While some of the component options for computing system 300 may include components prevalent in other computing systems, computing system 300 is a specialized computing system capable of performing the steps and processes described herein.

Computing system 300 includes two software components 320 for performing the functions of STAS unit 130 and DAE 150. Although computing system 300 as depicted in FIG. 3 includes two software components 320 in the present example, it should be understood that one or more components could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. Processing system 306 can be implemented within a single processing device but can also be distributed across multiple processing devices or sub-systems that cooperate in existing program instructions. Examples of processing systems 306 include central processing units, application specific processors, and logic devices, as well as any other type of processing device, combinations of processing devices, or variations thereof. While there are a number of processing devices available to comprise the processing system 306, the processing devices used for the processing system 306 are particular to this system and must specifically be capable of performing the processing necessary to execute method 200 and support system 100.

The storage system 304 can comprise any storage media readable by processing system 306, and capable of storing software 302 that is able to meet the needs of the specific computing system 300 and execute the storage required for method 200 and system 100. The storage system 304 may include volatile and non-volatile, removable and non-removable media implemented in any method or technology for storage of information, such as computer readable instructions, data structures, program modules, or other data. Storage system 304 may be implemented as a single storage device but may also be implemented across multiple storage devices or sub-systems. Storage system 304 can further include additional elements, such a controller capable of communicating with the processing system 306.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300. While many types of storage media may be incorporated into system 300, the storage media used must be specialized to the purpose of executing the storage requirements of method 200 and system 100 as described herein.

User interface 310 can include one or more DA desktops 110, a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display the DA desktop 110, customer contacts 120, contact analytics rules 135, inquiry analytics rules 155, any of the CIR knowledge documents 160, or another interface further associated with embodiments of the system and method as disclosed herein. Speakers, printers, haptic devices and other types of output devices may also be included in the user interface 310. A CSR or other staff can communicate with computing system 300 through the user interface 310 in order to view the DA desktop 110 or CIR knowledge documents 160, update contact analytics rules 135 or inquiry analytics rules 155, view, create, or modify customer contacts 120, or any number of other tasks the CSR or other staff may want to complete with computing system 300.

As described in further detail herein, computing system 300 receives and transmits data through communication interface 308. In embodiments, the communication interface 308 operates to send and/or receive data, such as, but not limited to, customer contacts 120, CIR knowledge documents 160, analytics results from operations in method 200, any other set of data that will necessitate or assist in an interaction between a customer and the CSR to/from other devices and/or systems to which computing system 300 is communicatively connected, and to receive and process customer interactions as described in greater detail above. Such data can include input or updates related to contact or inquiry analytics rules 135 or 155, or updates to DA system 100 or the method 200.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for developing a common inquiry response on a customer engagement center (CEC) system using a dynamic analysis (DA) system, comprising:

providing the DA system on the CEC system, wherein the DA system includes at least one DA desktop, at least one speech/text analytics service (STAS) unit, an inquiry-response database, a dynamic analysis engine (DAE), wherein the DAE is operatively connected to the at least one DA desktop, the at least one STAS unit, and the inquiry-response database;

receiving at least one customer contact into the at least one DA desktop, the customer contact comprising an inquiry and a response to the inquiry;

analyzing the customer contact in the at least one STAS unit according to at least one contact analytics rule to determine an inquiry/response content of the customer contact, wherein the inquiry/response content include an intent of the customer contact;

storing the customer contact in a corresponding inquiry-response sub-database from a set of inquiry-response sub-databases based on the inquiry/response content for the customer contact;

analyzing, using the DAE and a set of inquiry analytics rules, all customer contacts stored in the corresponding inquiry-response sub-database to generate a common response for the corresponding inquiry-response sub-database, including:
  comparing each customer contact stored in the corresponding inquiry-response sub-database to a remainder of the customer contacts stored in the corresponding inquire-response sub-database;
  using the set of inquiry analytics rules to cluster similar customer contacts based on the comparing, wherein the set of inquiry analytics rules include pattern matching algorithms and similarity recognition algorithms, further wherein one customer contact is considered more or less similar to a second customer contact based on the response in each customer contact;
  for each customer contact generating a similarity score based on the comparing and the clustering, wherein the higher the similarity score associated with the customer contact the more similar the response associated with the customer contact is to a remainder of the responses associated with a remainder of the customer contacts stored in the corresponding inquiry-response sub-database;
  assigning a common response indication to each customer contact with a similarity score above a threshold similarity score; and
  generating a common inquiry response (CIR) knowledge document including the response associated with each customer contact that includes the common response indication; and assigning, by the DAE, the common inquiry-response (CIR) knowledge document to the corresponding inquiry-response sub-database.

2. The method of claim 1, further comprising repeating receiving at least one customer contact into the at least one DA desktop, analyzing the customer contact in the at least one STAS unit according to at least one contact analytics rule to determine the content of the inquiry and the response, analyzing the inquiry/response content of the customer contact with the DAE, and storing the customer contact in a inquiry-response sub-database corresponding to the inquiry/response content until at least one of the inquiry-response sub-databases exceeds a data volume threshold.

3. The method of claim 1, further comprising regenerating and reassigning the CIR knowledge document after a set period, wherein analyzing pertaining to the regeneration includes any additional customer contacts stored in the corresponding inquiry-response sub-database.

4. The method of claim 1, further comprising analyzing the corresponding inquiry-response sub-database and detecting a shift in inquiries and responses to the inquiries beyond a preset threshold, and regenerating and reassigning the CIR knowledge document based on the shift.

5. The method of claim 1, further comprising regenerating and reassigning the CIR knowledge document upon change to the at least one contact analytics rule or the set of inquiry analytics rules.

6. The method of claim 1, further comprising manually reassigning the CIR knowledge document.

7. The method of claim 1, further comprising intercepting an incoming customer contact and analyzing it in real time with the STAS unit to determine at least one keyword or intent.

8. The method of claim 7, further comprising communicating the at least one keyword or intent to the DAE and determining if any CIR knowledge documents are applicable by analyzing the at least one keyword or intent with the DAE to identify any inquiry-response sub-databases that correspond to the at least one keyword or intent.

9. The method of claim 8, further comprising transmitting any CIR knowledge documents that are applicable to the DA desktop.

10. The method of claim 1, further comprising intercepting an outgoing customer contact and determining in real time if an author of the outgoing customer contact correctly used a CIR knowledge document by analyzing the outgoing customer contact with the DAE to generate a similarity score between the outgoing customer contact and the common responses included in the CIR knowledge document associated with the outgoing customer contact.

11. The method of claim 10, further comprising blocking the outgoing customer contact if the similarity score is below a low threshold.

12. The method of claim 10, further comprising copying the outgoing customer contact and flagging the outgoing customer contact for future review if the similarity score is below a low threshold.

13. The method of claim 10, further comprising rerouting the outgoing customer contact to the DA desktop for review if the similarity score is below a low threshold.

14. The method of claim 1, further comprising performing an analysis of at least one common inquiry topic, at least one trend in inquiry topics, or at least one user's use of CIR knowledge documents, wherein the analysis is performed using the DAE.

15. The method of claim 14, further comprising recommending at least one of an update to existing templates and/or scripts, a modification to customer service representative (CSR) training, or retraining a CSR.

16. The method of claim 14, further comprising updating publicly available information.

17. A customer engagement center (CEC) system for developing a common inquiry response, comprising:
  a dynamic analysis (DA) system, comprising:
    a DA processor; and
    a non-transitory computer readable medium programmed with computer readable code that upon execution by the DA processor causes the DA processor to execute a method for real-time predictive scheduling, comprising:
      receiving at least one customer contact, the customer contact comprising an inquiry and a response to the inquiry;

analyzing the customer contact in the at least one STAS unit according to at least one contact analytics rule to determine an inquiry/response content of the customer contact, wherein the inquiry/response content include an intent of the customer contact;

storing the customer contact in a corresponding inquiry-response sub-database from a set of inquiry-response sub-databases based on the inquiry/response content for the customer contact;

analyzing, using the DAE and a set of inquiry analytics rules, all customer contacts stored in the corresponding inquiry-response sub-database to generate a common response for the corresponding inquiry-response sub-database, including:

comparing each customer contact stored in the corresponding inquiry-response sub-database to a remainder of the customer contacts stored in the corresponding inquire-response sub-database;

using the set of inquiry analytics rules to cluster similar customer contacts based on the comparing, wherein the set of inquiry analytics rules include pattern matching algorithms and similarity recognition algorithms, further wherein one customer contact is considered more or less similar to a second customer contact based on the response in each customer contact:

for each customer contact generating a similarity score based on the comparing and the clustering, wherein the higher the similarity score associated with the customer contact the more similar the response associated with the customer contact is to a remainder of the responses associated with a remainder of the customer contacts stored in the corresponding inquiry-response sub-database:

assigning a common response indication to each customer contact with a similarity score above a threshold similarity score; and generating a common inquiry response (CIR) knowledge document including the response associated with each customer contact that includes the common response indication; and assigning, by the DAE, the common inquiry-response (CIR) knowledge document to the corresponding inquiry-response sub-database.

18. The CEC system of claim 17, wherein each inquiry-response sub-database includes customer contacts of a different intent.

19. The CEC system of claim 17, wherein the corresponding inquiry-response sub-database is analyzed using the DEA and set of inquiry analytics rules when a quantity of customer contacts stored in the corresponding inquiry-response sub-database exceeds a data volume.

20. A non-transitory computer readable medium programmed with computer readable code that upon execution by a dynamic analysis (DA) processor causes the DA processor to execute a method for developing a common inquiry response on a customer engagement center (CEC) system, comprising:

receiving at least one customer contact, the customer contact comprising an inquiry and a response to the inquiry;

analyzing the customer contact in the at least one STAS unit according to at least one contact analytics rule to determine an inquiry/response content of the customer contact, wherein the inquiry/response content include an intent of the customer contact;

storing the customer contact in a corresponding inquiry-response sub-database from a set of inquiry-response sub-databases based on the inquiry/response content for the customer contact;

analyzing, using the DAE and a set of inquiry analytics rules, all customer contacts stored in the corresponding inquiry-response sub-database to generate a common response for the corresponding inquiry-response sub-database, including; and comparing each customer contact stored in the corresponding inquiry-response sub-database to a remainder of the customer contacts stored in the corresponding inquire-response sub-database;

using the set of inquiry analytics rules to cluster similar customer contacts based on the comparing, wherein the set of inquiry analytics rules include pattern matching algorithms and similarity recognition algorithms, further wherein one customer contact is considered more or less similar to a second customer contact based on the response in each customer contact;

for each customer contact generating a similarity score based on the comparing and the clustering, wherein the higher the similarity score associated with the customer contact the more similar the response associated with the customer contact is to a remainder of the responses associated with a remainder of the customer contacts stored in the corresponding inquiry-response sub-database;

assigning a common response indication to each customer contact with a similarity score above a threshold similarity score; and generating a common inquiry response (CIR) knowledge document including the response associated with each customer contact that includes the common response indication; and assigning, by the DAE, the common inquiry-response (CIR) knowledge document to the corresponding inquiry-response sub-database.

* * * * *